(12) United States Patent
Cohen et al.

(10) Patent No.: US 7,532,718 B2
(45) Date of Patent: May 12, 2009

(54) HEADPHONE RECEIVER APPARATUS FOR USE WITH LOW POWER TRANSMITTERS

(75) Inventors: Arthur L. Cohen, Mountain View, CA (US); John Glissman, Valley Ford, CA (US)

(73) Assignee: Aerielle Technologies, Inc., Mountain View, CA (US)

( * ) Notice: Subject to any disclaimer, the term of this patent is extended or adjusted under 35 U.S.C. 154(b) by 712 days.

(21) Appl. No.: 11/033,230

(22) Filed: Jan. 10, 2005

(65) Prior Publication Data

US 2005/0152535 A1    Jul. 14, 2005

Related U.S. Application Data

(60) Provisional application No. 60/535,682, filed on Jan. 8, 2004.

(51) Int. Cl.
*H04R 25/00* (2006.01)
*H04M 1/00* (2006.01)
*H04M 9/00* (2006.01)
*H01Q 1/12* (2006.01)

(52) U.S. Cl. .................. 379/430; 381/370; 343/718

(58) Field of Classification Search ............ 379/428.01, 379/430; 381/370, 374–379; 455/575.3; 343/718, 752
See application file for complete search history.

(56) References Cited

U.S. PATENT DOCUMENTS

| | | | | |
|---|---|---|---|---|
| 4,553,264 A | * | 11/1985 | Hasegawa et al. | 455/189.1 |
| 5,428,829 A | * | 6/1995 | Osburn et al. | 455/197.1 |
| 5,949,384 A | * | 9/1999 | Ikushima | 343/866 |
| 6,424,820 B1 | * | 7/2002 | Burdick et al. | 455/41.1 |
| 6,453,157 B1 | * | 9/2002 | Roberts | 455/337 |
| 6,888,511 B2 | * | 5/2005 | Cake | 343/803 |
| 6,980,165 B2 | * | 12/2005 | Yuasa et al. | 343/718 |
| 2004/0005867 A1 | * | 1/2004 | Yu | 455/78 |
| 2006/0055605 A1 | * | 3/2006 | Peled et al. | 343/702 |

* cited by examiner

*Primary Examiner*—Curtis Kuntz
*Assistant Examiner*—Tuan D Nguyen
(74) *Attorney, Agent, or Firm*—Craig M. Stainbrook; Stainbrook & Stainbrook, LLP

(57) ABSTRACT

A headphone receiver apparatus for use with low power transmitters includes a pair of headphone speaker enclosures connected by a headband. An antenna element in the form of a spring steel band or a plastic cable/antenna band where one of the conductors is utilized as the antenna is configured generally concentric with but offset from the headband and the user's head by at least 0.5 inches over at least some length of the antenna. Low-noise performance is improved by a low noise amplifier incorporated before the receiver IC, and a bandpass filter interposed between the low noise amplifier and the receiver IC. A base-loading inductor is used to tune the antenna element to resonance, with or without capacative end-loading. Lumped inductors, ferrite beads, or a parallel resonant LC circuit may be used to isolate the shield conductor at RF frequencies, and/or to reduce the loading of the other conductors.

9 Claims, 2 Drawing Sheets

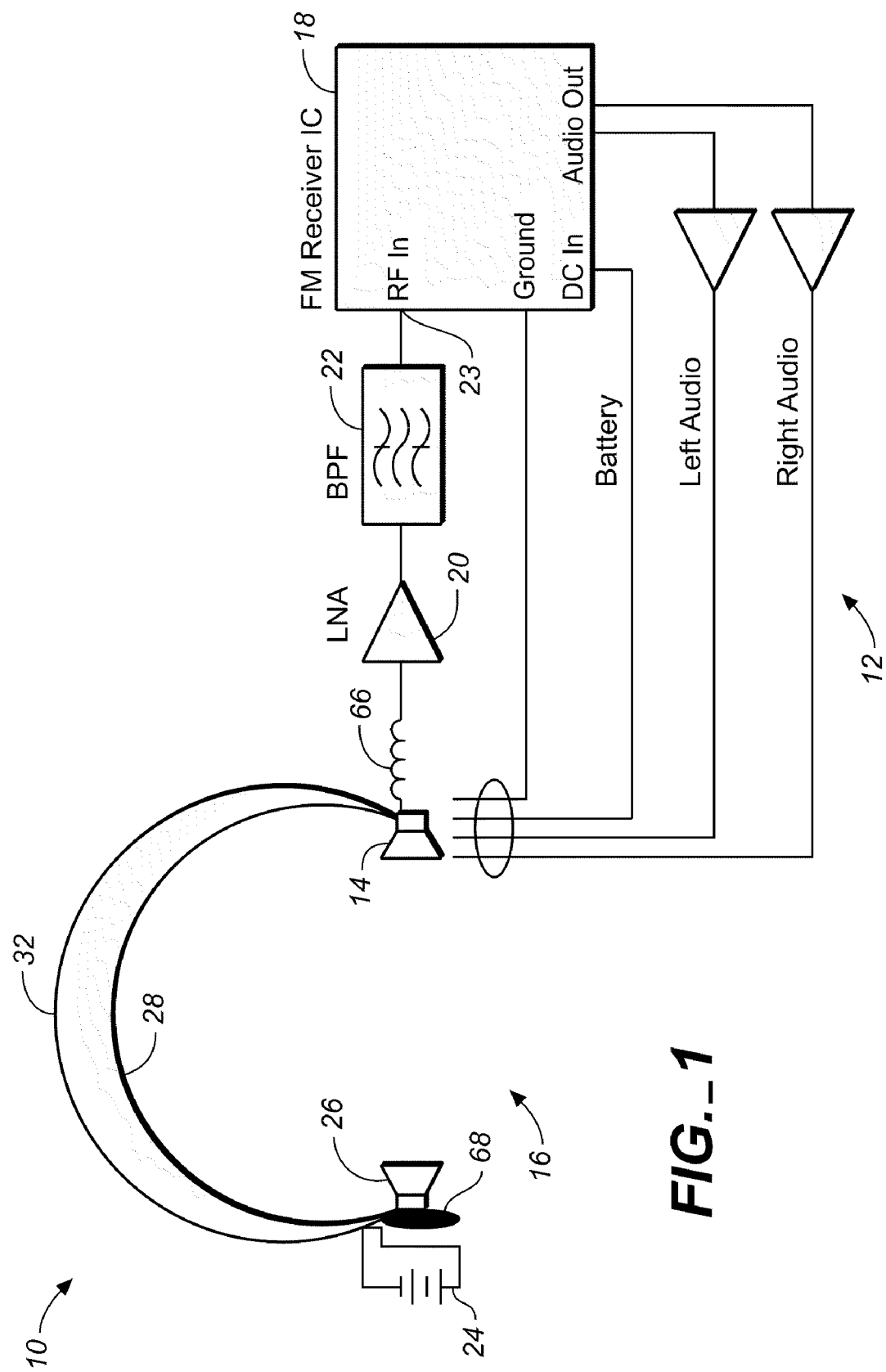
FIG._1

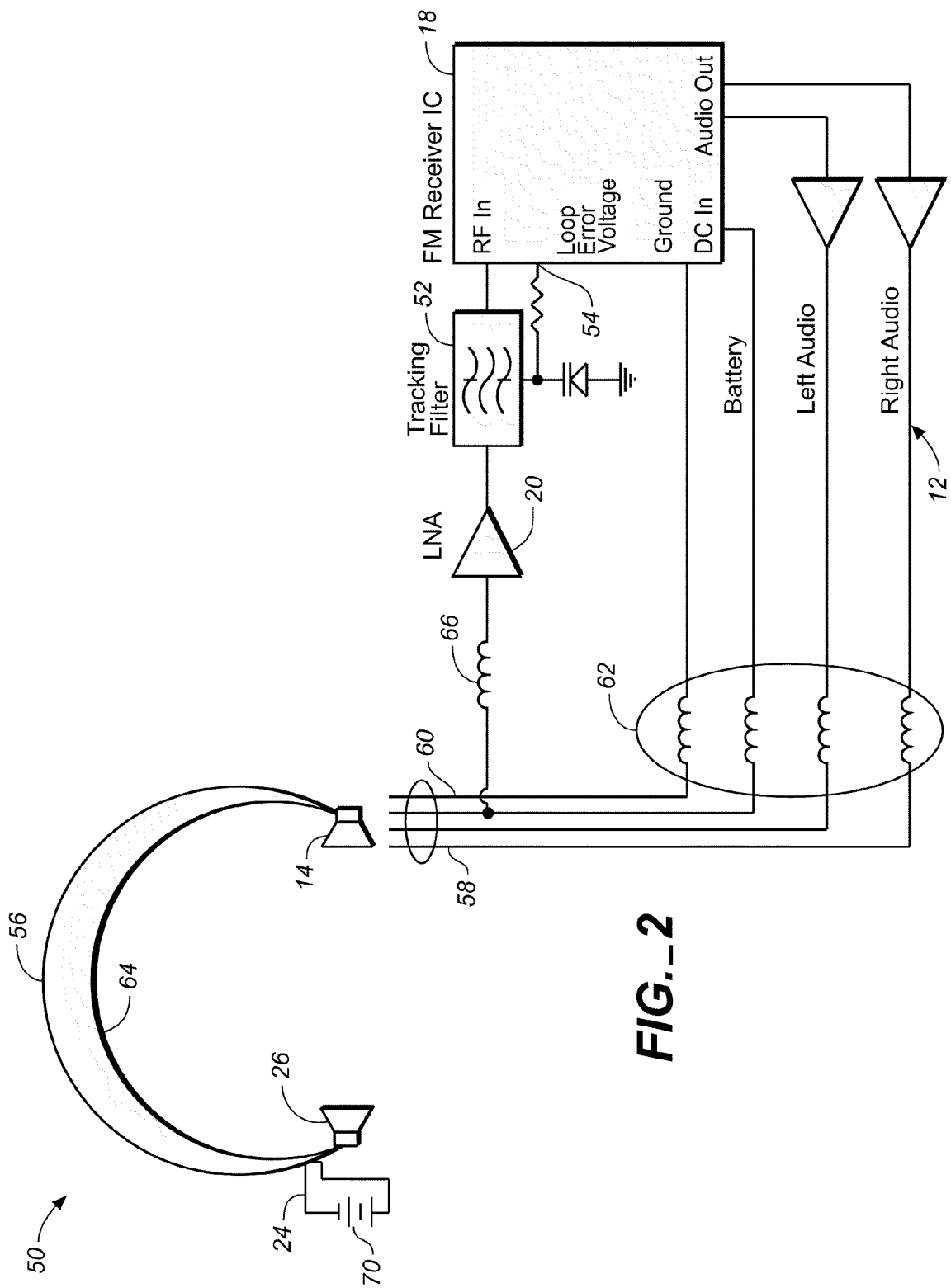
FIG._2

HEADPHONE RECEIVER APPARATUS FOR USE WITH LOW POWER TRANSMITTERS

CROSS REFERENCE TO RELATED APPLICATIONS

The present application claims the benefit of the filing date of U.S. Provisional Patent Application Ser. No. 60/535,682, filed 8 Jan. 2004.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to radio transmitters and receivers, and more particularly to an improved headphone receiver apparatus for use with low power transmitters.

BACKGROUND INFORMATION AND DISCUSSION OF RELATED ART

Known FM receiver headphones have unsatisfactory performance when used with low power FM transmitter products. Existing FM receiver headphone products are typically designed for urban and suburban use where the signal level of the desired signal is quite strong. In such an environment a proper receiver may be designed with good selectivity (i.e., the ability to reject unwanted adjacent channel signals) but not very good sensitivity due to the intermodulation problems it can cause, and the component cost of achieving increased sensitivity. The fact that reduced sensitivity is acceptable in these devices also allows a compromise in antenna implementation, while still yielding satisfactory results with strong signals.

As low power FM transmitter products are limited to very low output power by regulatory authorities, a low-noise receiver and optimum antenna are required to maximize the useful range of a receiver.

The foregoing discussion reflects the current state of the art of which the present inventor is aware. Reference to, and discussion of, this information is intended to aid in discharging Applicant's acknowledged duty of candor in disclosing information that may be relevant to the examination of claims to the present invention. However, it is respectfully submitted that none of the above information discloses, teaches, suggests, shows, or otherwise renders obvious, either singly or when considered in combination, the invention described and claimed herein.

BRIEF SUMMARY OF THE INVENTION

The headphone receiver apparatus for use with low power transmitters of this invention provides an improved headphone apparatus having a pair of headphone speaker enclosures connected by a generally arcuate headband, with the receiver electronics contained in one of the enclosures. An antenna element in the form of a spring steel band or a plastic cable/antenna band where one of the conductors is utilized as the antenna is configured generally concentric with but radially offset from the headband and the user's head by at least 0.5 inches over at least some length of the antenna. Low-noise performance is improved by incorporation of a low noise amplifier before the receiver IC, and a lumped-element bandpass filter (or, alternatively, a varactor-tuned bandpass filter) interposed between the low noise amplifier and the receiver IC. A base-loading inductor may be used to tune the antenna element to resonance, with or without capacative end-loading. An isolator in the form of lumped inductors, ferrite beads, or a parallel resonant LC circuit may be used to isolate the shield conductor at RF frequencies, and/or to reduce the loading of the other conductors.

It is therefore an object of the present invention to provide a new and improved headphone receiver.

It is another object of the present invention to provide new and improved receiver electronics for an FM receiver.

A further object or feature of the present invention is a new and improved low noise receiver.

An even further object of the present invention is to provide a novel antenna configuration for low-noise receivers.

Other novel features which are characteristic of the invention, as to organization and method of operation, together with further objects and advantages thereof will be better understood from the following description considered in connection with the accompanying drawing, in which preferred embodiments of the invention are illustrated by way of example. It is to be expressly understood, however, that the drawing is for illustration and description only and is not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the national patent office(s) and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 1 is a schematic view of a first embodiment of a headphone receiver apparatus of this invention; and FIG. 2 is a schematic view of an alternate embodiment of a headphone receiver apparatus of this invention.

DETAILED DESCRIPTION OF THE INVENTION

Referring to FIGS. 1 and 2, wherein like reference numerals refer to like components in the various views, FIG. 1 is a schematic view of a first embodiment of a headphone receiver apparatus 10 of this invention. Headphone receiver apparatus 10 includes receiver electronics 12 incorporated into a first speaker enclosure or side 14 of headset 16, beginning with a conventional FM receiver IC (integrated circuit) 18 and enhancing performance by connecting a low-noise amplifier 20 and band pass filter 22 to RF In 23. The low-noise amplifier 20 reduces the noise figure of the receiver IC 18 from 9-10 dB (for the IC alone) to about 3 dB. The band pass filter 22, with a bandwidth of about 2 MHz, reduces the number of high-power commercial FM stations the receiver chip 18 sees, thereby improving intermodulation performance. In this embodiment, band pass filter 22 is a fixed tuning lumped element filter tuned to only the portion of the band being used (typically 88.1 MHz to 88.9 MHz). Battery compartment 24 is preferably located in the other side of the headset 16 in second speaker enclosure or side 26 for weight balance and aesthetics.

First and second sides 14, 26 are connected by a more or less traditional generally arcuate headband element 28, generally contacting and conforming to the curvature of the user's head. In this embodiment, audio and battery cables 30 are be routed through the headband 28. Spring steel band antenna element 32 is generally concentric with but radially offset from headband 28 over most of its length by at least 0.5 inches, and preferably at least 1.0 to 1.5 inches. This spacing between the antenna element and the headband/user's head (as well as the audio/battery cables) is critical to antenna performance, as it minimizes the loading and detuning caused by proximity of the antenna to the user's head. The antenna system is thus optimized for good performance without any external whip elements or wires.

FIG. 2 is a schematic view of an alternate embodiment 50 of a headphone receiver apparatus of this invention. This embodiment 50 uses a varactor-tuned tracking filter 52 interposed between low noise amplifier 20 and receiver IC 18, which is capable of being tuned over the entire FM band (i.e., 88 to 108 MHz). Tuning of this filter 52 is derived from the loop error voltage 54 in the receiver's local oscillator phase locked loop.

This alternate embodiment 50 uses a hard plastic cable/antenna band 56 with a narrow channel along one edge to route a multi-conductor cable 58. One conductor such as the battery return lead (ground) 60 is utilized as the antenna element. This is accomplished by isolating this conductor from ground on the receiver 18 PCB with an isolator 62 such as a series inductor, ferrite bead, or parallel resonant tank circuit. This provides a DC path to ground that is a high impedance at RF. In addition, similar isolation is provided on the other wires in the cable at each end, making these lines high impedance at RF and thus reducing the loading effect on the antenna conductor 60.

This embodiment also incorporates a generally arcuate headband support 64 to maintain a gap or offset of at least 0.5 inches, and preferably at least 1 to 1.5 inches, between the cable/antenna band 56 and the headband 64 (and the user's head). Thus, the antenna is again offset from the user's head to minimize loading and detuning.

Either embodiment may uses methods to control the electrical length of the antenna conductor for resonance at the desired frequency(s). Base loading with a series inductor 66 at the receiver end of the antenna 32 (FIG. 1) or antenna 56 (FIG. 2) may be used to make the antenna conductor act electrically longer. Another method to accomplish this electrical lengthening is capacitive end loading at the end opposite the receiver by attaching the antenna 32 to a metal disk 68 in the battery compartment (FIG. 1), or attaching the antenna 56 to the batteries 70 themselves to be used as the loading element (FIG. 2). As a still further alternative, a varactor-tuned resonance of the antenna for wideband designs may be implemented.

Thus, the headphone receiver apparatus of this invention provides an antenna element in the form of a spring steel band, or a plastic cable/antenna band where one of the conductors is utilized as the antenna (in particular, the battery return conductor or shield of a multi-conductor cable), generally concentric with but offset from the headband and the user's head by at least 0.5 inches over at least some length of the antenna. Performance may be enhanced by providing a low noise amplifier before the receiver IC, and a lumped-element bandpass filter (or, alternatively, a varactor-tuned bandpass filter) between the low noise amplifier and the receiver IC. A base-loading inductor may be used to tune the antenna element to resonance, with or without capacitive end-loading. Lumped inductors, ferrite beads, or a parallel resonant LC circuit may be used to isolate the shield conductor at RF frequencies, and/or to reduce the loading of the other conductors.

The foregoing disclosure is sufficient to enable one having skill in the art to practice the invention without undue experimentation, and provides the best mode of practicing the invention presently contemplated by the inventor. While there is provided herein a full and complete disclosure of the preferred embodiments of this invention, it is not intended to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Accordingly, the proper scope of the present invention should be determined only by the broadest interpretation of the appended claims so as to encompass all such modifications as well as all relationships equivalent to those illustrated in the drawings and described in the specification.

What is claimed as invention is:

1. A headphone receiver apparatus for use with low power transmitters, said apparatus comprising: a pair of headphone speaker enclosures connected by a headband; receiver electronics contained in one of said enclosures; an antenna element generally concentric with but radially offset from said headband, said antenna element disposed between and connected to each of the speaker enclosures in said pair of head phone speaker enclosures and positioned such that a spacing from the user's head of at least 0.5 inches is maintained over substantially all of the length of said antenna element; wherein said receiver electronics includes a receiver integrated circuit (IC), further including a low noise amplifier connected to said receiver IC and a lumped-element band pass filter interposed between said antenna element and said low noise amplifier so as to minimize the level of other strong inband signals presented to the low noise amplifier, thereby minimizing intermodulation products.

2. The headphone receiver apparatus of claim 1 wherein said antenna element comprises a spring steel band.

3. The headphone receiver apparatus of claim 1 wherein said antenna element comprises a plastic cable/antenna band where one of the conductors is utilized as an antenna conductor.

4. The headphone receiver apparatus of claim 3 wherein said antenna conductor is isolated to reduce loading from other nearby conductors at RF frequencies by series lumped inductors.

5. The headphone receiver apparatus of claim 3 wherein said antenna conductor is isolated to reduce loading from other nearby conductors at RF frequencies by series ferrite beads.

6. The headphone receiver apparatus of claim 3 wherein said antenna conductor is isolated to reduce loading from other nearby conductors at RF frequencies by series parallel resonant LC circuit.

7. The headphone receiver apparatus of claim 1 further including a varactor-tuned bandpass filter interposed between said low noise amplifier and said receiver IC.

8. The headphone receiver apparatus of claim 1 further including a base-loading inductor to tune said antenna element to resonance.

9. The headphone receiver apparatus of claim 1 wherein said antenna element includes capacitive end-loading.

* * * * *